(12) United States Patent
Wagner

(10) Patent No.: US 6,931,861 B2
(45) Date of Patent: Aug. 23, 2005

(54) ANTI-SCORE PLATES

(75) Inventor: Stefan J Wagner, Derby (GB)

(73) Assignee: Rolls-Royce plc, London (GB)

(*) Notice: Subject to any disclaimer, the term of this patent is extended or adjusted under 35 U.S.C. 154(b) by 168 days.

(21) Appl. No.: 10/462,643

(22) Filed: Jun. 17, 2003

(65) Prior Publication Data

US 2004/0020216 A1 Feb. 5, 2004

(30) Foreign Application Priority Data

Jul. 13, 2002 (GB) .............................. 0216355

(51) Int. Cl.[7] .............................................. F02C 7/00
(52) U.S. Cl. .................. 60/796; 74/573 R; 464/180; 415/119; 415/122; 416/144; 416/500
(58) Field of Search .............. 60/796, 805; 74/573 R, 74/574; 403/39; 464/180; 415/119, 122; 416/144, 145, 500

(56) References Cited

U.S. PATENT DOCUMENTS

| | | | | |
|---|---|---|---|---|
| 1,645,323 A | * | 10/1927 | Griswold | .................. 74/573 R |
| 2,441,619 A | * | 5/1948 | Daily et al. | ................ 74/573 R |
| 2,715,446 A | * | 8/1955 | Felt | ............................ 416/145 |
| 2,798,383 A | | 7/1957 | Van Cleave | |
| 3,916,495 A | | 11/1975 | Klassen | |
| 3,964,342 A | * | 6/1976 | Beam et al. | ................ 74/573 R |
| 4,220,055 A | * | 9/1980 | Dubois et al. | ............ 74/573 R |
| 5,214,585 A | | 5/1993 | Ehrich | |

FOREIGN PATENT DOCUMENTS

| | | |
|---|---|---|
| DE | 0 894 922 A | 10/1953 |
| DE | 2 411 077 | 11/1975 |
| SU | 0 765 534 | 9/1980 |

* cited by examiner

Primary Examiner—Louis J. Casaregola
(74) Attorney, Agent, or Firm—W. Warren Taltavull; Manelli Denison & Selter PLLC

(57) ABSTRACT

A gas turbine engine flanged shaft (120) is provided with a plurality of anti-score plates (6a, 6b) each of which has two openings which are aligned with corresponding apertures on the flange. Bolts (4) pass through the openings and apertures to attach the anti-score plates (6a, 6b) to the flange (2). The anti-score plates (6a, 6b) have different masses to facilitate shaft balancing.

5 Claims, 3 Drawing Sheets

ANTI-SCORE PLATES

The present invention relates to anti-score plates for use in balancing and protecting a bolted rotatable flange. In particular, it relates to the use of such anti-score plates in a gas turbine engine.

It is common practice to use bolts and nuts to attach flanges together. A problem arises, however, if the bolt head makes direct contact with the flange surface. On tightening the bolt, the bolt head may scratch the flange surface which may ultimately lead to the cracking and breaking of the flange. It is not possible simply to put a washer between the bolt head and the flange surface because on tightening the bolt, the washer itself may rotate and damage the flange surface. The problem has therefore been addressed by using an anti-score plate instead of a washer. Instead of having a single hole for receiving a single bolt, an anti-score plate has a plurality of holes each of which receives a bolt. Therefore the anti-score plate does not rotate on tightening the bolts.

Figure 1:
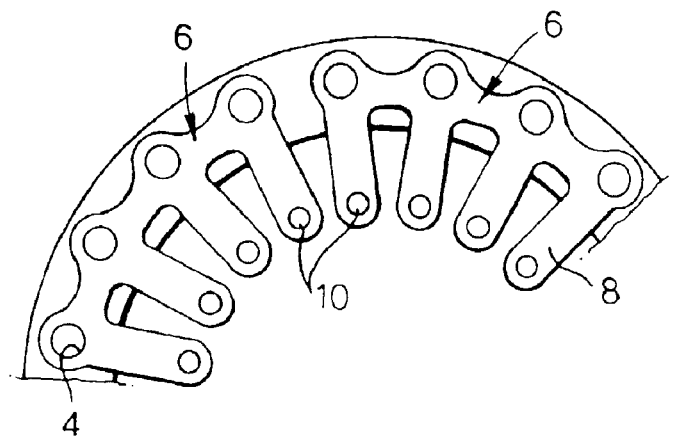

It is common practice to use flanges to connect rotating shafts. The flange of one rotating shaft is bolted to the flange of the other rotating shaft. A problem, however, arises if the connected shafts are rotating at reasonably high speeds. The flanges may introduce off-axis inertia which if not balanced, will impede the smooth rotation of the connected shafts. This problem has been addressed in the prior art by using balance weights attached to the flange or using anti-score plates which have balance weights attached to balance the rotating shaft. FIG. 1 illustrates a prior art balanced bolted flange. A flange 2 is bolted using a plurality of bolts 4. An anti-score plate 6 protects the surface of the flange 2 from the heads of the bolts 4. The anti-score plates 6 are identical and have digit-like extensions 8. Each of the digit-like extensions 8 has a hole 10 at its extremity. Balance weights of different masses may be attached via the holes 10. Typically, a balance weight comprises a screw, nut and washer(s) assembly. If more mass is required at a particular position, then the assembly carries more washers or heavier washers.

There are several drawbacks to this solution. A large number of individual balancing weights are required to balance the rotatable flange and the balanced rotatable shaft is therefore heavy. There is a limitation to the maximum mass a balance weight can have and it is often not possible to position the appropriate balancing mass at the appropriate position.

Thus the prior art provides an arrangement comprising:
a flange of a rotatable shaft, comprising a plurality of apertures;
a multiplicity of anti-score plates each having two or more openings aligned with corresponding apertures of the flange; and
a plurality of bolts extending through the plurality of apertures in the flange and the corresponding openings in the anti-score plates wherein each of the anti-score plates is the same.

The present invention is characterised in that the multiplicity of anti-score plates includes at least a first anti-score plate having a first mass and at least a second different anti-score plate having a second different mass.

According to one aspect of the present invention there is provided an arrangement as claimed in claim 1.

According to another aspect of the present invention there is provided a set of anti-score plates for use with a bolted rotatable flange as claimed in claim 6.

According to another aspect of the present invention there is provided a method of attaching a first shaft to a second shaft for substantially balanced rotation as claimed in claim 7.

Embodiments of the present invention therefore allow the use of different anti-score plates having different masses. Consequently, more balance weight can be concentrated at an optimum position by using a heavier anti-score plate. Thus, embodiments of the present invention provide greater balancing capability. In addition, the balanced rotatable shaft will be lighter.

The anti-score plates are preferably of the same thickness but have different shape. Using plates of the same thickness means that bolts of standard size may be used for all anti-score plates regardless of their mass.

Figure 2:
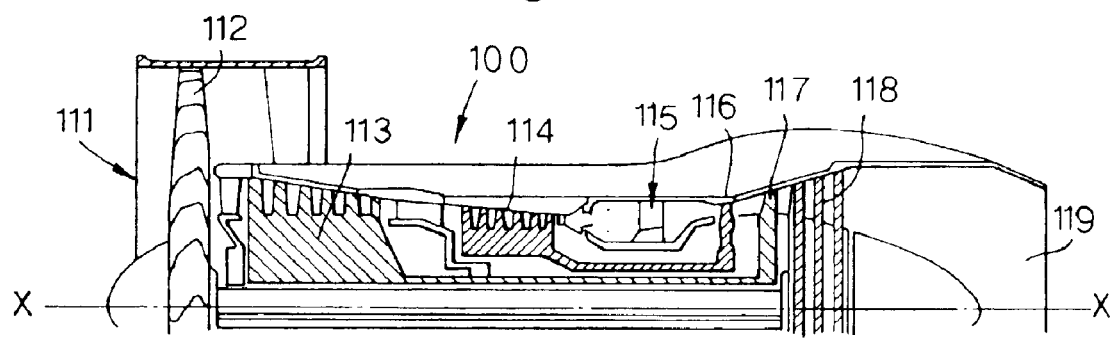
Figure 3:
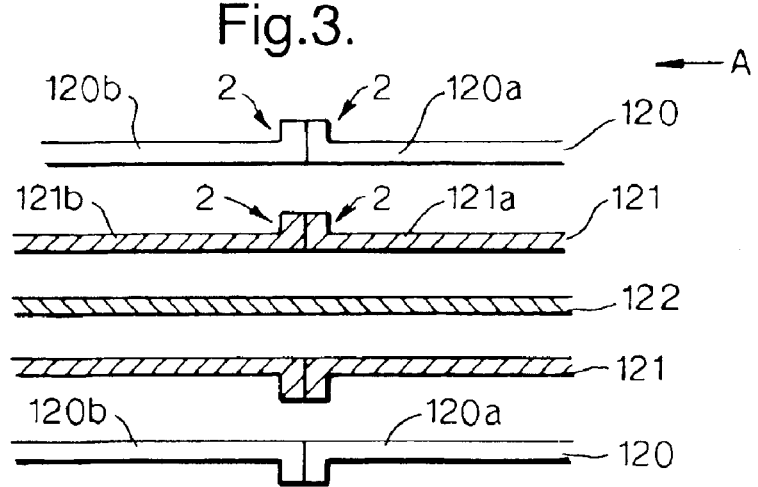
Figure 4:
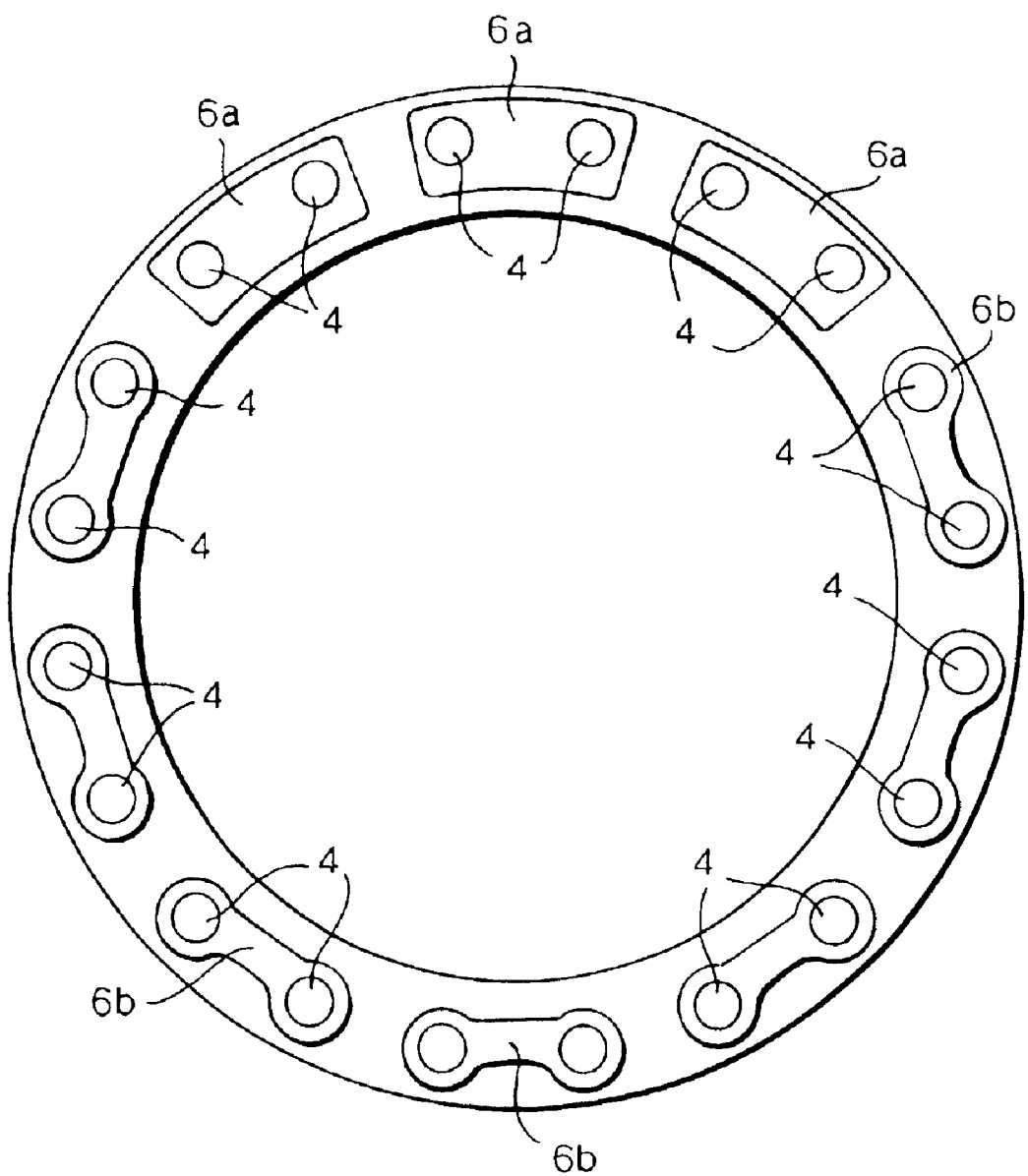
Figure 5:
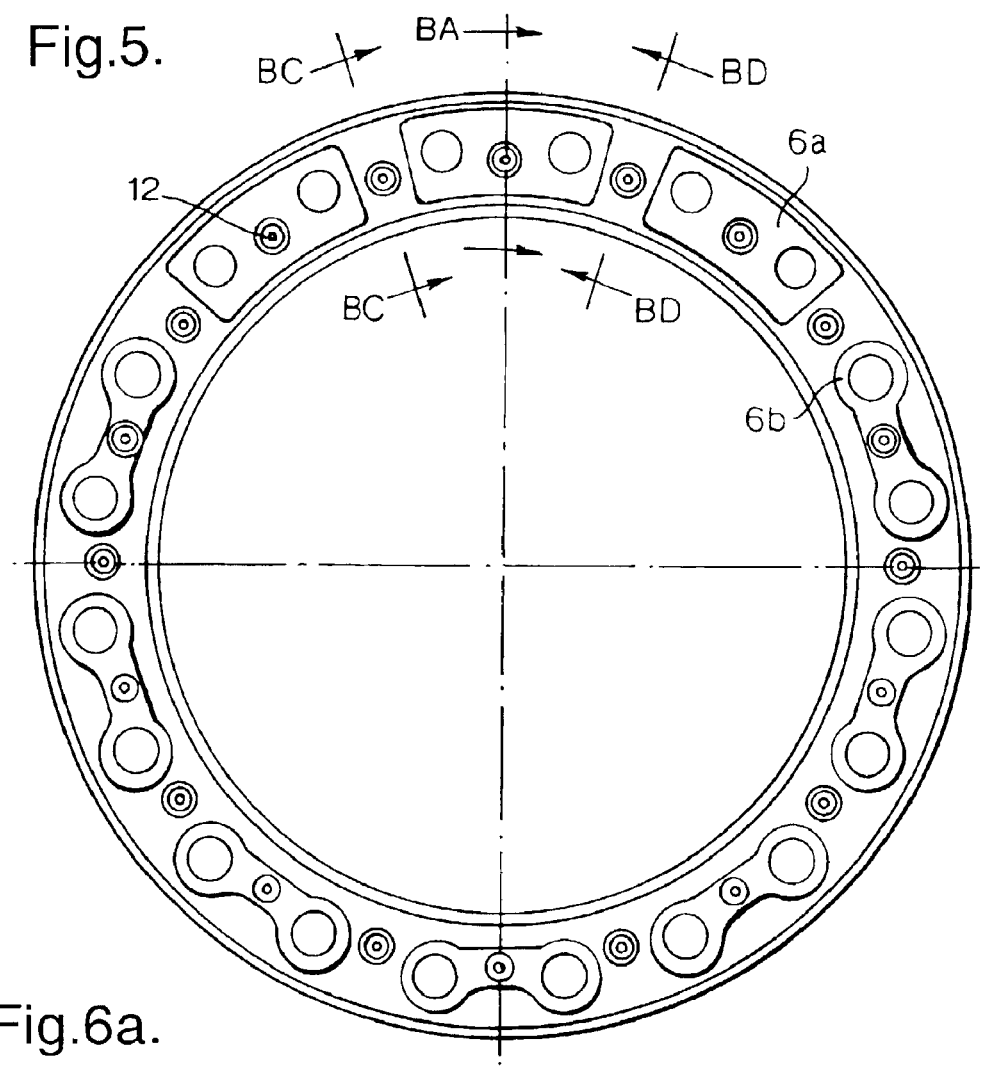
Figure 6A:
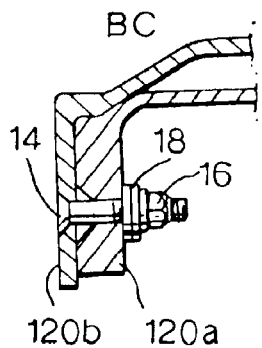
Figure 6B:
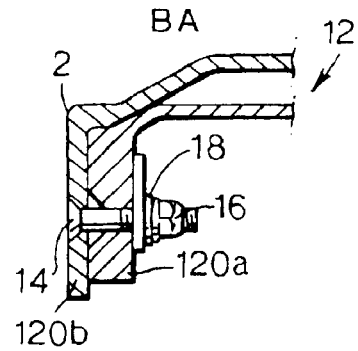
Figure 6C:
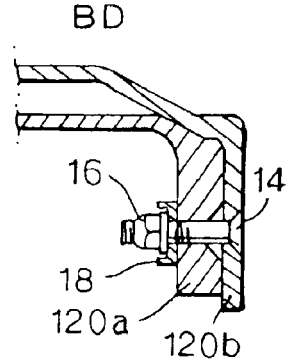

For a better understanding of the present invention reference will now be made, by way of example only, to the accompanying drawings in which:

FIG. 1 illustrates prior art anti-score plates;
FIG. 2 illustrates a gas turbine engine;
FIG. 3 illustrates an arrangement of turbine shafts;
FIG. 4 illustrates a balanced bolted flange according to a first embodiment;
FIG. 5 illustrates a balanced bolted flange according to a second embodiment; and
FIGS. 6A, 6B and 6C illustrate fine balance adjusters.

FIG. 2 illustrates a gas turbine engine 100 comprising, in axial flow series, an air intake 111, a propulsive fan 112, an intermediate pressure compressor 113, a high pressure compressor 114, a combustor 115, a turbine arrangement comprising a high pressure turbine 116, an intermediate pressure turbine 117 and a low pressure turbine 118, and an exhaust nozzle 119.

The gas turbine 100 operates in a conventional manner so that air entering the intake 111 is accelerated by the fan 112 which produces two air flows: a first air flow into the intermediate pressure compressor 113 and a second air flow which provides propulsive thrust. The intermediate pressure compressor 113 compresses the air flow directed into it before delivering that air to the high pressure compressor 114 where further compression takes place.

The compressed air exhausted from the high pressure compressor 114 is directed into the combustor 115 where it is mixed with fuel and the mixture combusted. The resultant hot combustion products then expand through and thereby drive the high, intermediate and low pressure turbines 116, 117 and 118, before being exhausted through the nozzle 119 to provide additional propulsive thrust. The high, intermediate and low pressure turbines 116, 117 and 118 respectively drive via high speed shaft 120, intermediate speed shaft 121 and low speed shaft 122, the high pressure compressors 114, the intermediate pressure compressors 113 and the fan 112. The high speed shaft 120 rotates at approximately 12,000 rpm and the intermediate speed shaft rotates at approximately 8,000 rpm.

FIG. 3 illustrates the high speed shaft 120, the intermediate speed shaft 121 and the low speed shaft 122. The shafts are coaxial with the low speed shaft 122 being positioned inside the intermediate speed shaft 121. The intermediate speed shaft 121 is positioned inside the high speed shaft 120. The high speed shaft 120 comprises a first shaft 120a and a second shaft 120b connected via bolted flanges 2. The intermediate speed shaft 121 comprises a first intermediate speed shaft 121a and a second intermediate speed shaft 121b connected via bolted flanges 2. The flanges are connected together using bolts and nuts. Anti-score plates are positioned between the heads of the bolts and the surface of the flange or between the nuts and the surface of the flange.

FIG. 4 illustrates a bolted flange according to one embodiment of the present invention. The view presented in FIG. 4 is of the flange 2 of the first high speed shaft 120a when observed from direction A in FIG. 3. The flange 2 is annular has a plurality of apertures (not shown) evenly spaced a radius R1. Each of the apertures receives a bolt 4. The head of the bolts is illustrated in the figure. Each of the bolts 4 passes through the flange 2, through the adjacent flange 2 of the second high speed shaft 120b and is secured in place using a nut. An anti-score plate 6a, 6b is positioned between the head of each of the bolts 4 and the surface of the flange 2. In this embodiment, the anti-score plates each receive two bolts. There are two different types of anti-score plates which are of the same thickness but different shape. A first type of anti-score plate 6a has a first mass and a second type of anti-score plate 6b has a second mass, less than the first mass. In this embodiment, twenty bolts 4, three first anti-score plates 6a and seven second anti-score plates 6b are used. The arrangement of the first anti-score plates 6a and the second anti-score plates 6b is such that the high speed shaft 120 is balanced for rotation.

FIG. 5 illustrates a modification to the embodiment of FIG. 4. The flange 2 again has twenty bolts 4, three first anti-score plates 6a and seven second anti-score plates 6b. The flange 2 is annular and the apertures for the bolts 4 lie on a circle of radius R1. The arrangement in addition, has fine balance adjusters 12. There are twenty fine balance adjusters 12. They are positioned on a circle of radius R2 (R2 less than R1). A fine balance adjuster 12 is positioned between each of the bolts 4 of each of the anti-score plates and a fine balance adjuster is positioned between each of the anti-score plates. The fine balance adjuster 12 is illustrated in more detail in each of FIGS. 6a, 6b and 6c. There is a hole in each of the flanges 2 of the first high speed shaft 120a and the second high speed shaft 120b. The holes in the flanges are aligned and a screw 14 extends through the hole and is held in place by a nut 16. One or more washers 18 are positioned between the nut 16 and the flange 2. The number and shape of the washers 18 used can be varied to adjust the mass at a specific point of the flange. Thus in FIG. 6a there is illustrated two washers 18 of the same size and shape, in FIG. 6b there is illustrated two washers 18 of different size and shape and in FIG. 6c there is illustrated a washer 18 of a particular shape. The higher the rotational speed of the shaft carrying the flange 2, the greater the requirement for fine balancing of the shaft using the fine balance adjusters 12.

Although the present invention has been described in the preceding paragraphs with reference to various examples, it should be appreciated that modifications and variations to the examples given can be made without departing from the spirit and scope of the invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An arrangement comprising:
    a flange of a rotatable shaft, comprising a plurality of apertures;
    a multiplicity of anti-score plates each having at least two openings aligned with corresponding apertures of the flange;
    a plurality of bolts extending through the plurality of apertures in the flange and the corresponding openings of the anti-score plates, the multiplicity of anti-score plates comprising at least a first anti-score plate having a first mass and at least a second different anti-score plate having a second, different, mass.

2. An arrangement as claimed in claim 1, wherein the first anti-score plate and the second anti-score plate have the same thickness.

3. An arrangement as claimed in claim 1, wherein the multiplicity of anti-score plates are arranged so that the rotatable flange is substantially balanced.

4. An arrangement as claimed in claim 3, further comprising fine balance adjustment means.

5. A gas turbine engine comprising an arrangement as claimed in claim 1 for connecting turbine shafts of the gas turbine engine.

* * * * *